US011307634B1

(12) United States Patent
Masters (10) Patent No.: US 11,307,634 B1
(45) Date of Patent: Apr. 19, 2022

(54) MAINTAINING HISTORICAL POWER LEVEL METADATA FOR DYNAMIC VOLTAGE AND FREQUENCY SCALING OF PROCESSOR INSTRUCTIONS

(71) Applicant: Red Hat, Inc., Raleigh, NC (US)

(72) Inventor: Jonathan C. Masters, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/160,980

(22) Filed: Jan. 28, 2021

(51) Int. Cl.
*G06F 1/00* (2006.01)
*G06F 1/324* (2019.01)
*G06F 1/28* (2006.01)

(52) U.S. Cl.
CPC .............. *G06F 1/324* (2013.01); *G06F 1/28* (2013.01)

(58) Field of Classification Search
None
See application file for complete search history.

(56) References Cited

U.S. PATENT DOCUMENTS

| | | | |
|---|---|---|---|
| 7,840,825 B2 | 11/2010 | Altevogt et al. | |
| 8,495,300 B2 | 7/2013 | Ng et al. | |
| 9,015,504 B2 | 4/2015 | Tran | |
| 10,775,873 B2 | 9/2020 | Lee et al. | |
| 2005/0132243 A1* | 6/2005 | Edwards | H03K 19/00369 713/300 |
| 2013/0138977 A1* | 5/2013 | Herman | G06F 1/324 713/300 |

(Continued)

FOREIGN PATENT DOCUMENTS

| | | |
|---|---|---|
| JP | 5694735 B2 | 4/2015 |
| KR | 101863578 B1 | 7/2018 |

OTHER PUBLICATIONS

Cheng, Zhinan, et al., "Automatic Frame Rate-Based DVFS Of Game," 2015 IEEE 26th International Conference on Application-specific Systems, Architectures and Processors (ASAP), Jul. 2015, 2 pages.

(Continued)

*Primary Examiner* — Nitin C Patel
(74) *Attorney, Agent, or Firm* — Withrow & Terranova, PLLC (57) ABSTRACT

Maintaining historical power level metadata for dynamic voltage and frequency scaling of processor instructions is disclosed. A power predictor receives, from a power controller that controls voltage and/or frequency of a processor core of a processor device, a processor core power quantifier that corresponds to a voltage or frequency of the processor core while executing a processor instruction. The power predictor, based on the processor core power quantifier, stores an instruction power level in association with the processor instruction. The power predictor subsequently determines that the processor instruction is to be executed by the processor core at a future point in time. The power predictor accesses the instruction power level previously stored in association with the processor instruction. The power predictor, prior to the processor instruction being executed by the processor core, communicates to the power controller a proposed power level based on the instruction power level.

20 Claims, 6 Drawing Sheets (56) References Cited

U.S. PATENT DOCUMENTS

2014/0068285 A1* 3/2014 Lee .................. G06F 1/324
713/300

OTHER PUBLICATIONS

Jang, Hyung Beom et al., "A Trace Cache with DVFS Techniques for a Low Power Microprocessor," Third 2008 International Conference on Convergence and Hybrid Information Technology, Nov. 2008, 6 pages.

* cited by examiner

MAINTAINING HISTORICAL POWER LEVEL METADATA FOR DYNAMIC VOLTAGE AND FREQUENCY SCALING OF PROCESSOR INSTRUCTIONS

BACKGROUND

Modern processors utilize dynamic voltage and frequency scaling (DVFS) to adjust operating points to workload.

SUMMARY

The examples disclosed herein maintain an instruction power level that is associated with the execution of a processor instruction. It is subsequently determined that the processor instruction is to be executed by the processor core at a future point in time. The instruction power level is obtained and provided to a power controller that controls the voltage and/or frequency of the processor core prior to the processor instruction being executed to allow the power controller to initiate a power level transition even prior to the execution of the processor instruction.

In one example a method is provided. The method includes receiving, by a power predictor from a power controller that controls voltage and/or frequency of a processor core of a processor device, a processor core power quantifier that corresponds to a voltage or frequency of the processor core while executing a processor instruction. The method further includes storing, by the power predictor based on the processor core power quantifier, an instruction power level in association with the processor instruction. The method further includes subsequently determining, by the power predictor, that the processor instruction is to be executed by the processor core at a future point in time. The method further includes accessing the instruction power level previously stored in association with the processor instruction. The method further includes, prior to the processor instruction being executed by the processor core, communicating, by the power predictor to the power controller, a proposed power level based on the instruction power level.

In another implementation a processor device is disclosed. The processor device includes a processor core and a power controller to control voltage and/or frequency of the processor core. The processor device further includes a power predictor, wherein the power predictor may receive, from the power controller, a processor core power quantifier that corresponds to a voltage or frequency of the processor core while executing a processor instruction. The power predictor may further store, based on the processor core power quantifier, an instruction power level in association with the processor instruction. The power predictor may further subsequently determine that the processor instruction is to be executed by the processor core at a future point in time. The power predictor may further access the instruction power level previously stored in association with the processor instruction and, prior to the processor instruction being executed by the processor core, communicate, to the power controller, a proposed power level based on the instruction power level.

In another implementation a non-transitory computer-readable storage medium is disclosed. The non-transitory computer-readable storage medium includes executable instructions to cause a power predictor of a processor device to receive, from a power controller that controls voltage and/or frequency of a processor core, a processor core power quantifier that corresponds to a voltage or frequency of the processor core while executing a processor instruction. The instructions further cause the power predictor to store, based on the processor core power quantifier, an instruction power level in association with the processor instruction. The instructions further cause the power predictor to subsequently determine that the processor instruction is to be executed by the processor core at a future point in time. The instructions further cause the power predictor to access the instruction power level previously stored in association with the processor instruction, and prior to the processor instruction being executed by the processor core, communicate, to the power controller, a proposed power level based on the instruction power level.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Modern processors utilize dynamic voltage and frequency scaling (DVFS) to adjust operating points to workload. It can take a period of time for the state of a processor core to change from one voltage or frequency to another voltage or frequency. The examples disclosed herein maintain an instruction power level that is associated with the execution of a processor instruction. It is subsequently determined that the processor instruction is to be executed by the processor core at a future point in time. The instruction power level is obtained and provided to a power controller that controls the voltage and/or frequency of the processor core. The power controller receives the instruction power level and determines if the current power level is consistent with the instruction power level associated with the processor instruction to be imminently executed, and if not, the power controller can initiate a power level transition even prior to the execution of the processor instruction.

Figure 1A:
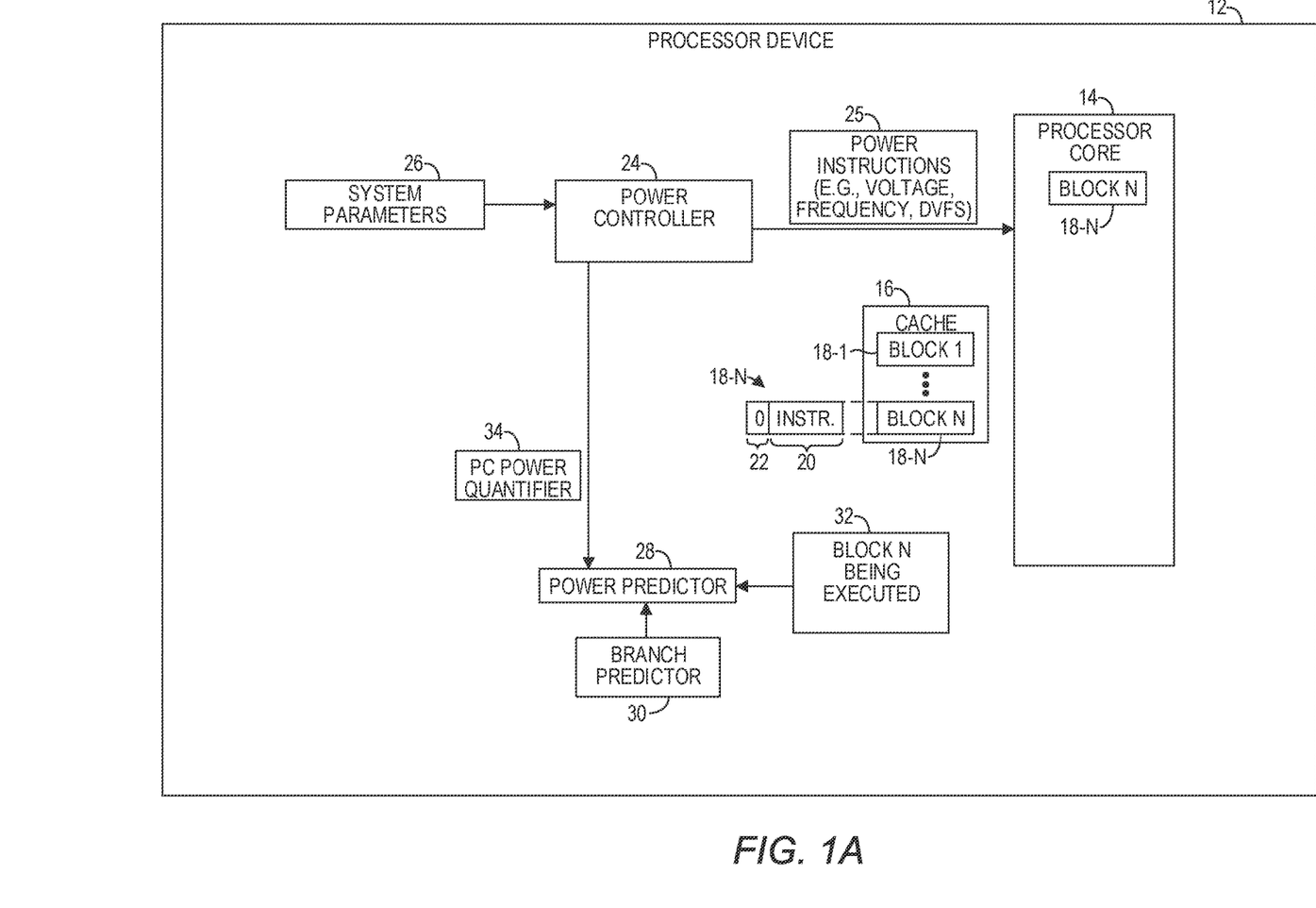
FIGS. 1A-1C are block diagrams of a processor device at different points in time according to one example.
Figure 1B:
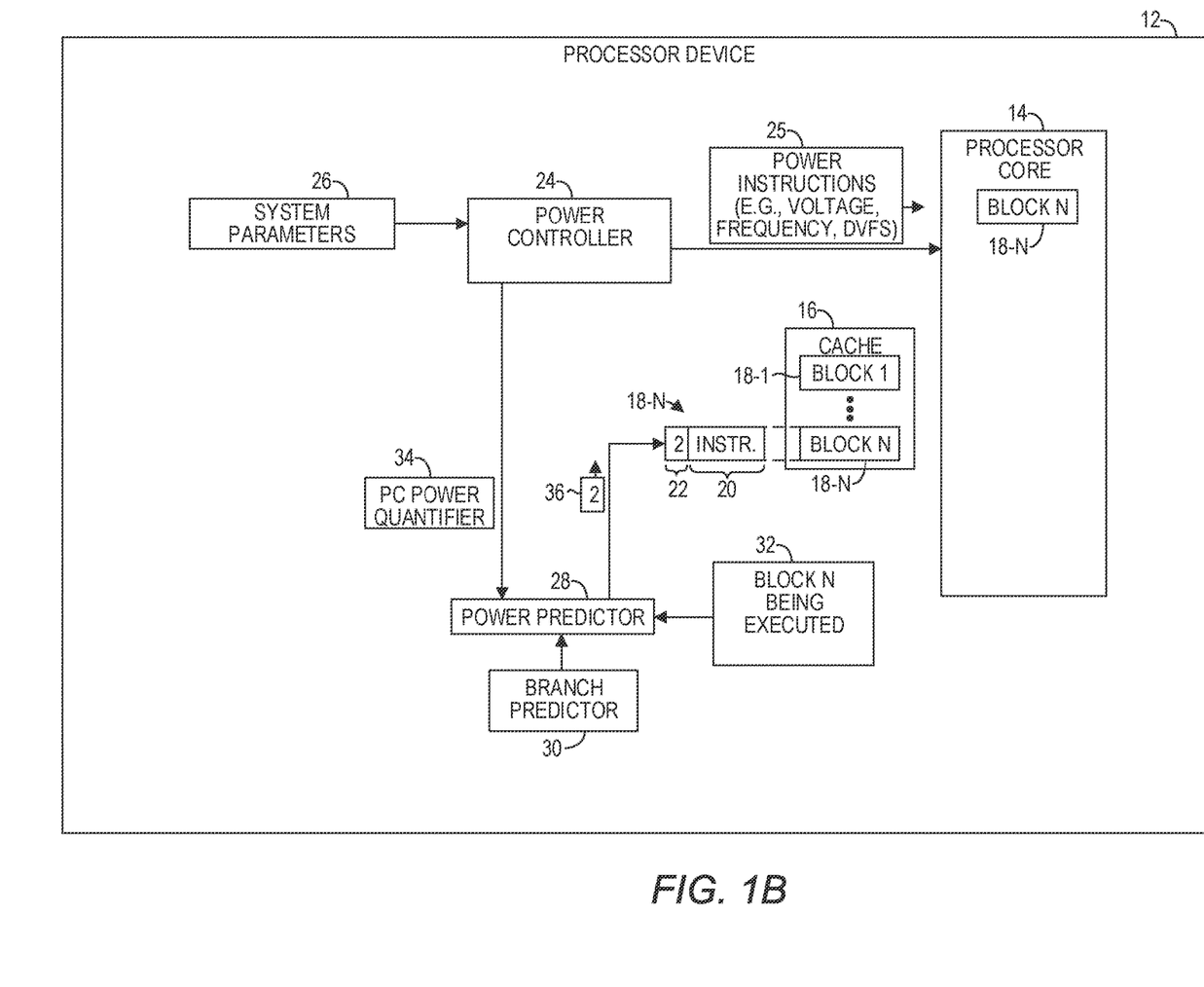
Figure 1C:
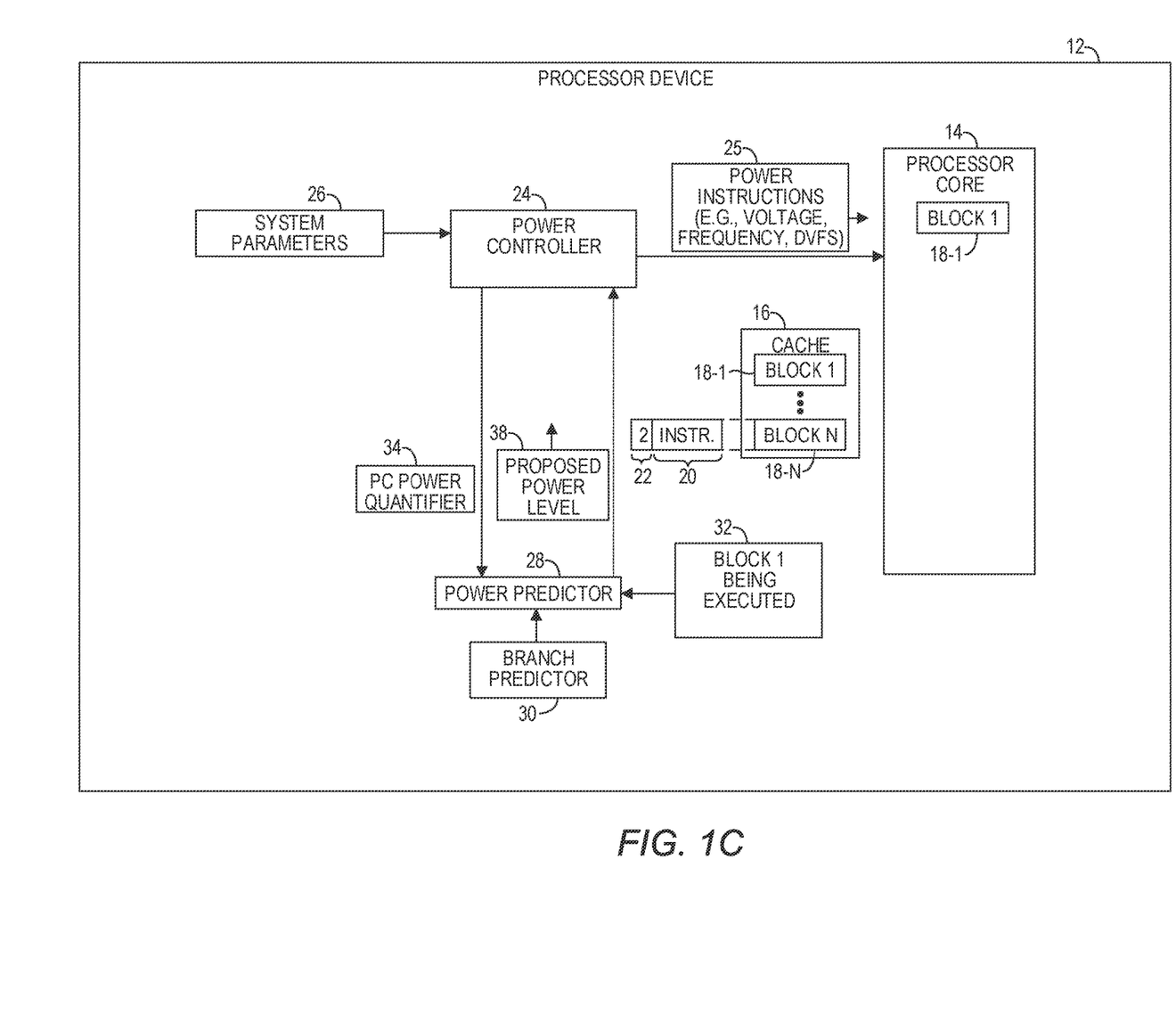

FIGS. 1A-1C are block diagrams of a processor device 12 at different points in time according to one example. The processor device 12 includes one or more processor cores 14 (only one illustrated for purposes of space). The processor device 12 includes a cache 16 in which cache blocks 18-1-18-N (generally, cache blocks 18, and sometimes referred to as cache lines) are stored prior to execution by the processor core 14. Each cache block 18 comprises data identifying one or more processor instructions 20, and metadata 22 (e.g., information) about the processor instructions 20. The data identifying the one or more processor instructions 20 may comprise a reference to another cache, or a location in a different memory where the processor instructions 20 are located, or may comprise the actual processor instructions 20.

The processor device 12 includes a power controller 24 that controls voltage and/or frequency of the processor core 14 via power instructions 25. The power controller 24 may control the voltage and/or frequency through one or more dynamic voltage and frequency scaling (DVFS) states, each state corresponding to a different voltage and/or frequency. The power controller 24 dynamically determines the power instructions 25 at an instant in time based on one or more system parameters 26, which may include, by way of non-limiting example, a temperature of the one or more processor cores 14, a total electrical current usage by the one or more processor cores 14, an instantaneous workload experienced by the one or more processor cores 14, and the like. The particular system parameters 26 utilized by the power controller 24 may differ depending on a manufacturer and/or design of the processor device 12.

The processor device 12 also includes a power predictor 28 that operates to provide proposed power levels to the power controller 24 for processor instructions that are to be imminently executed by the processor core 14 based on previous power states of the processor core 14 when executing the same processor instructions.

An example of an operation of the power predictor 28 in accordance with one implementation will now be discussed. The power predictor 28 continuously receives information from a branch predictor 30 identifying processor instructions that are to be executed by the processor core 14 at an imminent future point in time. The power predictor 28 also receives information 32 regarding what processor instructions are currently being executed. In this implementation, the power predictor 28 receives information that identifies the particular cache block 18 that is being executed, although it is apparent other information could be provided to the power predictor 28 to identify processor instructions that are currently being executed. In this example, the power predictor 28 determines that the processor instructions 20 of the cache block 18-N are being executed. The power predictor 28 also continuously receives, from the power controller 24, a real-time processor core power quantifier 34 that corresponds to a voltage or frequency of the processor core 14 while executing the processor instructions 20 contained in the cache block 18-N. The processor core power quantifier 34 may take any form, and in some implementations, may comprise a particular DVFS state of a plurality of possible DVFS states to which the processor core 14 can be set by the power controller 24. The components discussed herein, such as the power predictor 28 and the power controller 24 may be implemented in any desired manner, such as in silicon, firmware, application specific integrated circuits (ASICs), field programmable gate arrays (FPGAs), or programmable processor devices.

Referring now to FIG. 1B, the power predictor 28, based on the processor core power quantifier 34 received from the power controller 24 and the information 32 that identifies the processor instructions 20 in the cache block 18-N as currently being executed, stores an instruction power level 36 in association with the processor instructions 20 in the cache block 18-N. In particular, the power predictor 28 stores the instruction power level 36 in the metadata 22 of the cache block 18-N. The instruction power level 36 may be the same value as the processor core power quantifier 34 or may be translated to a different value. In some implementations, the processor core power quantifier 34 and the instruction power level 36 is a DVFS state.

Referring now to FIG. 1C, at a point in time subsequent to that illustrated in FIG. 1B, the power predictor 28 determines that a processor instruction in the cache block 18-N is to be executed by the processor core 14 at a future point in time. The power predictor 28 may make this determination based on information received from the branch predictor 30. The power predictor 28 accesses the instruction power level 36 previously stored in the metadata 22 of the cache block 18-N. Prior to the processor core 14 executing the processor instructions 20, the power predictor 28 communicates a proposed power level 38 that is based on the instruction power level 36 to the power controller 24. The proposed power level 38 may be the same value as the instruction power level 36 or may be translated to a different value. In some implementations, the proposed power level 38 and the instruction power level 36 is a DVFS state. The power controller 24 determines a current power level of the processor core 14 and, if suitable, generates new power instructions 25 in accordance with the proposed power level 38 and sends the new power instructions 25 to the processor core 14.

Figure 2:
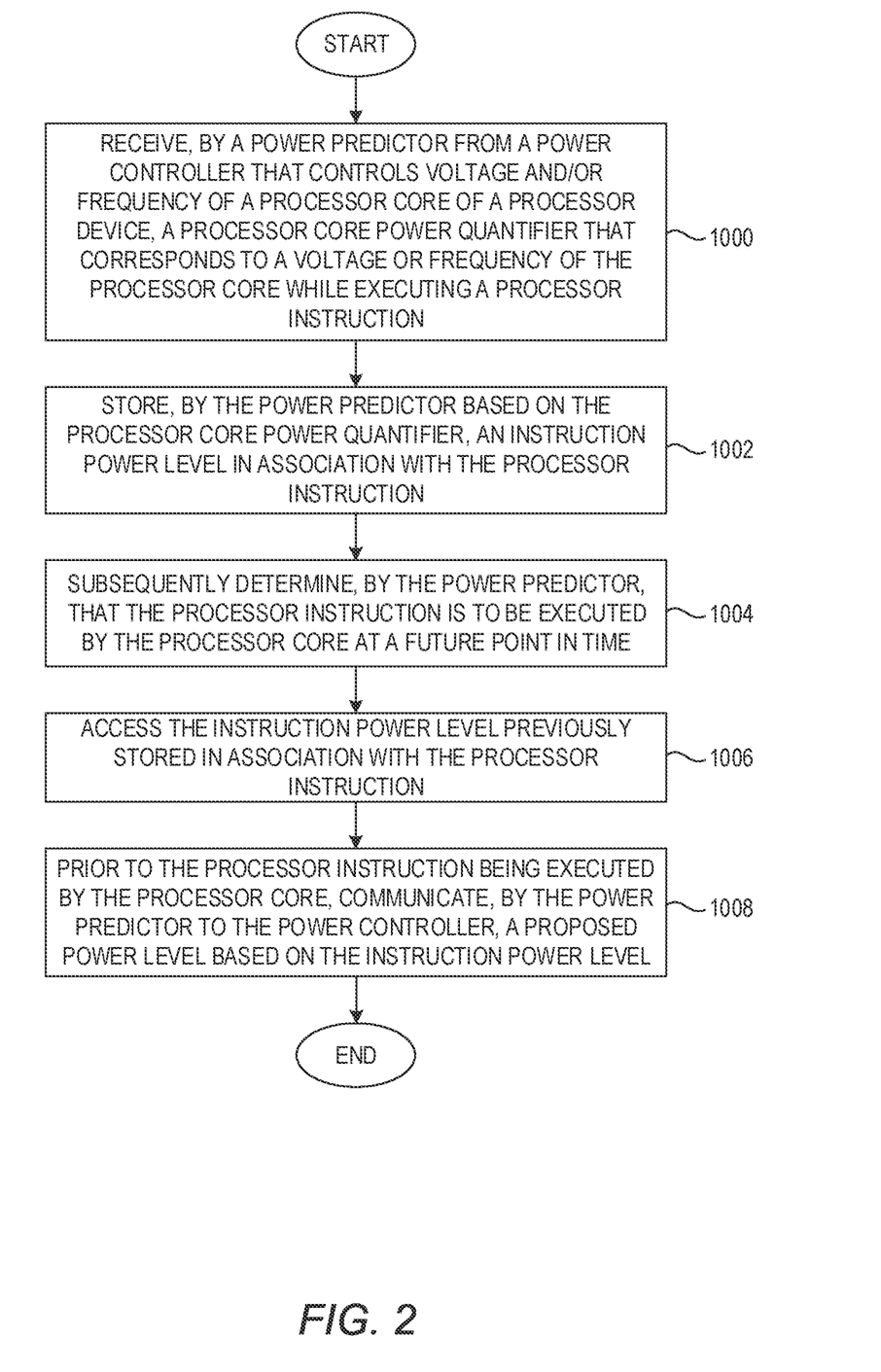
FIG. 2 is a flowchart of a method for maintaining historical power level metadata for dynamic voltage and frequency scaling of processor instructions according to one example.

FIG. 2 is a flowchart of a method for maintaining historical power level metadata for dynamic voltage and frequency scaling of processor instructions according to one example. FIG. 2 will be discussed in conjunction with FIGS. 1A-1C. The power predictor 28 receives, from the power controller 24 that controls voltage and/or frequency of the processor core 14 of the processor device 12, the processor core power quantifier 34 that corresponds to a voltage or frequency of the processor core 14 while executing the processor instruction in the cache block 18-N (FIG. 2, block 1000). The power predictor 28 stores, based on the processor core power quantifier 34, the instruction power level 36 in association with the processor instruction (FIG. 2, block 1002). The power predictor 28 subsequently determines that the processor instruction in the cache block 18-N is to be executed by the processor core 14 at a future point in time (FIG. 2, block 1004). The power predictor 28 accesses the instruction power level 36 previously stored in association with the processor instruction stored in the cache block 18-N (FIG. 2, block 1006). The power predictor 28, prior to the processor instruction being executed by the processor core 14, communicates to the power controller 24 the proposed power level 38 based on the instruction power level 36 (FIG. 2, block 1008).

Figure 3:
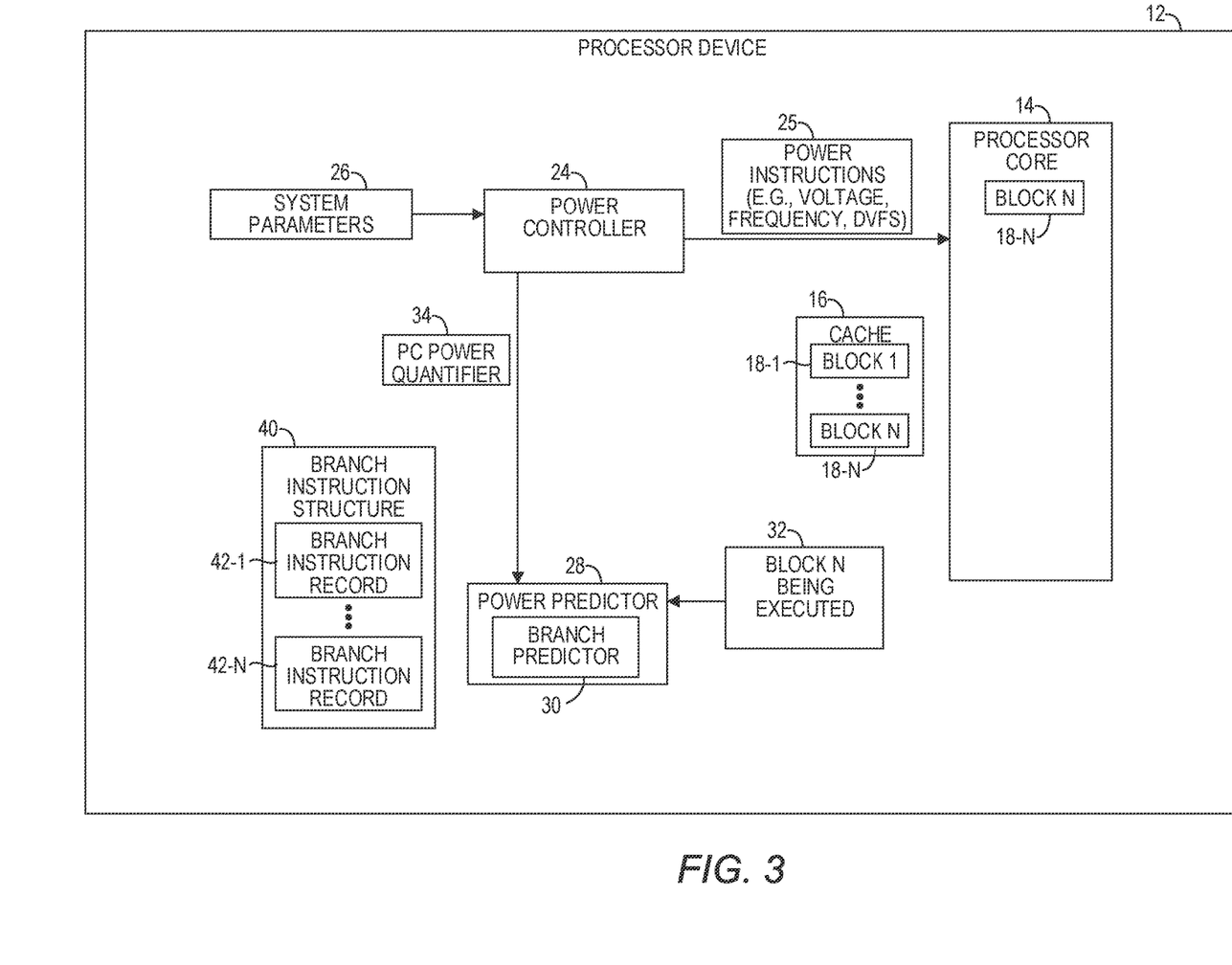
FIG. 3 is a block diagram of the processor device according to another example.

FIG. 3 is a block diagram of the processor device 12 according to another example. In this example the power predictor 28 may include the branch predictor 30. In this example, the branch predictor 30 maintains a branch instruction structure 40 in which the branch predictor 30 stores a plurality of branch instruction records 42-1-42-N (generally, branch instruction records 42), each branch instruction record 42 corresponding to a particular processor branch instruction. The terms "processor branch instruction" and "branch instruction" as used herein refers to a processor instruction that, upon execution, causes the execution of a different instruction sequence than the processor instructions that successively follow the branch instruction.

In this example the power predictor 28 stores the instruction power level in the branch instruction record 42 corresponding to the processor branch instruction that immediately preceded the execution of the corresponding processor instructions. In some examples, each branch instruction record 42 may include some function, such as, by way of non-limiting example, a bloom filter, that receives a plurality of instruction power levels over time and, upon request, provides a particular instruction power level to the power predictor 28. In particular, the power predictor 28 may associate a bloom filter with each branch instruction record 42. The bloom filter is populated over time. The bloom filter is then interrogated to determine which instruction power level should be provided to the power controller 24. In some implementations, a secondary prediction circuit may determine whether the bloom filter is frequently returning incorrect predictions, in which case the bloom filter may be flushed (causing it to be repopulated) or temporarily disabled.

When the branch predictor 30 determines that a particular branch instruction is to be imminently executed, the power predictor 28 accesses the branch instruction record 42 that corresponds to the branch instruction, retrieves an instruction power level from the branch instruction record 42, and provides a proposed power level to the power controller 24 prior to execution of the branch instruction by the processor core 14.

Figure 4:
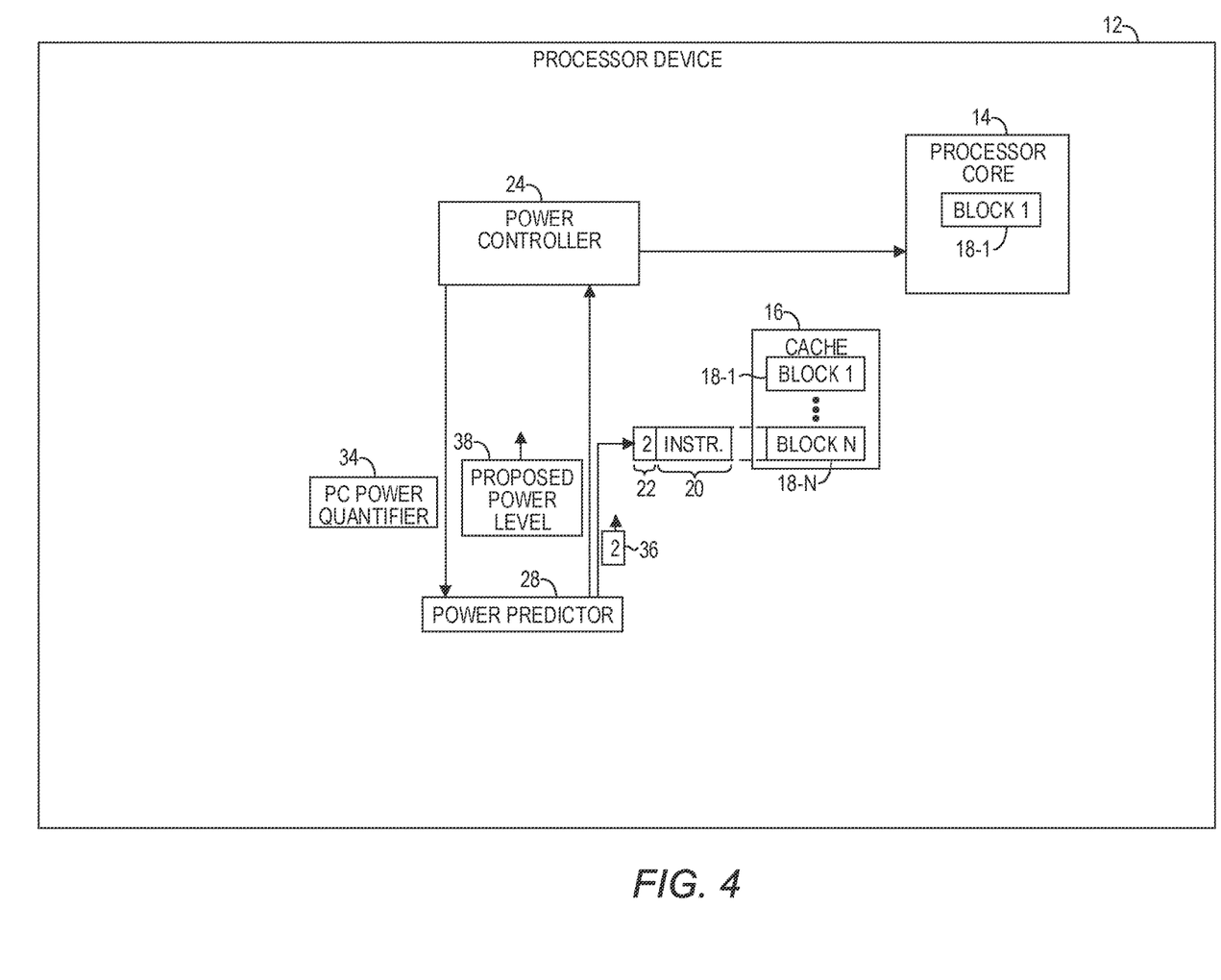
FIG. 4 is a simplified block diagram of the processor device illustrated in FIGS. 1A-1C according to one implementation.

FIG. 4 is a simplified block diagram of the processor device 12 according to one implementation. The processor device 12 includes the processor core 14, the power controller 24, and the power predictor 28. The power predictor 28 is to receive, from the power controller 24, the processor core power quantifier 34 that corresponds to the voltage or frequency of the processor core 14 while executing a processor instruction. The power predictor 28 is to, based on the processor core power quantifier 34, store the instruction power level 36 in association with the processor instruction. The power predictor 28 is to subsequently determine that the processor instruction is to be executed by the processor core 14 at a future point in time. The power predictor 28 is to access the instruction power level 36 previously stored in association with the processor instruction, and prior to the processor instruction being executed by the processor core 14, communicate, to the power controller 24, the proposed power level 38 based on the instruction power level 36.

Individuals will recognize improvements and modifications to the preferred examples of the disclosure. All such improvements and modifications are considered within the scope of the concepts disclosed herein and the claims that follow.

What is claimed is:

1. A method comprising:
    receiving, by a power predictor from a power controller that controls voltage and/or frequency of a processor core of a processor device, a processor core power quantifier that corresponds to a voltage or frequency of the processor core while executing a processor instruction;
    storing, by the power predictor based on the processor core power quantifier, an instruction power level in association with the processor instruction;
    subsequently determining, by the power predictor, that the processor instruction is to be executed by the processor core at a future point in time;
    accessing the instruction power level previously stored in association with the processor instruction; and
    prior to the processor instruction being executed by the processor core, communicating, by the power predictor to the power controller, a proposed power level based on the instruction power level.

2. The method of claim 1 wherein storing, by the power predictor based on the processor core power quantifier, the instruction power level in association with the processor instruction comprises:
    determining a particular cache block of a plurality of cache blocks in a memory cache that corresponds to the processor instruction, each cache block comprising data that identifies a respective processor instruction and metadata about the respective processor instruction; and
    storing, in metadata of the particular cache block, the instruction power level.

3. The method of claim 1 wherein the proposed power level comprises a dynamic voltage and frequency scaling (DVFS) power state.

4. The method of claim 1 wherein the proposed power level corresponds to a particular frequency.

5. The method of claim 1 wherein the proposed power level corresponds to a particular voltage.

6. The method of claim 1 wherein the power predictor comprises a branch predictor and the processor instruction comprises a branch instruction, and wherein storing, by the power predictor based on the processor core power quantifier, the instruction power level in association with the processor instruction further comprises storing the instruction power level in association with the branch instruction.

7. The method of claim 6 wherein storing the instruction power level in association with the branch instruction further comprises storing the instruction power level in association with a bloom filter that corresponds to the branch instruction.

8. The method of claim 1 further comprising:
    receiving, by the power controller, the proposed power level;
    determining that the processor core is executing at a power level that differs from the proposed power level; and
    instructing the processor core to execute at the proposed power level.

9. A processor device comprising:
a processor core;
a power controller to control voltage and/or frequency of the processor core; and
a power predictor;
wherein the power predictor is to:
   receive, from the power controller, a processor core power quantifier that corresponds to a voltage or frequency of the processor core while executing a processor instruction;
   store, based on the processor core power quantifier, an instruction power level in association with the processor instruction;
   subsequently determine that the processor instruction is to be executed by the processor core at a future point in time;
   access the instruction power level previously stored in association with the processor instruction; and
   prior to the processor instruction being executed by the processor core, communicate, to the power controller, a proposed power level based on the instruction power level.

10. The processor device of claim 9 wherein to store, by the power predictor based on the processor core power quantifier, the instruction power level in association with the processor instruction, the power predictor is further to:
   determine a particular cache block of a plurality of cache blocks in a memory cache that corresponds to the processor instruction, each cache block comprising data that identifies a respective processor instruction and metadata about the respective processor instruction; and
   store, in metadata of the particular cache block, the instruction power level.

11. The processor device of claim 9 wherein the proposed power level comprises a dynamic voltage and frequency scaling (DVFS) power state.

12. The processor device of claim 9 wherein the proposed power level corresponds to a particular frequency.

13. The processor device of claim 9 wherein the proposed power level corresponds to a particular voltage.

14. The processor device of claim 9 wherein the power predictor comprises a branch predictor and the processor instruction comprises a branch instruction, and wherein to store, by the power predictor based on the processor core power quantifier, the instruction power level in association with the processor instruction, the power predictor is further to store the instruction power level in association with the branch instruction.

15. The processor device of claim 14 wherein to store the instruction power level in association with the branch instruction, the power predictor is further to store the instruction power level in association with a bloom filter that corresponds to the branch instruction.

16. The processor device of claim 9 wherein the power predictor is further to:
   receive, by the power controller, the proposed power level;
   determine that the processor core is executing at a power level that differs from the proposed power level; and
   instruct the processor core to execute at the proposed power level.

17. A non-transitory computer-readable storage medium that includes executable instructions to cause a power predictor of a processor device to:
   receive, from a power controller that controls voltage and/or frequency of a processor core, a processor core power quantifier that corresponds to a voltage or frequency of the processor core while executing a processor instruction;
   store, based on the processor core power quantifier, an instruction power level in association with the processor instruction;
   subsequently determine that the processor instruction is to be executed by the processor core at a future point in time;
   access the instruction power level previously stored in association with the processor instruction; and
   prior to the processor instruction being executed by the processor core, communicate, to the power controller, a proposed power level based on the instruction power level.

18. The non-transitory computer-readable storage medium of claim 17 wherein to store, by the power predictor based on the processor core power quantifier, the instruction power level in association with the processor instruction, the instructions further cause the power predictor to:
   determine a particular cache block of a plurality of cache blocks in a memory cache that corresponds to the processor instruction, each cache block comprising data that identifies a respective processor instruction and metadata about the respective processor instruction; and
   store, in metadata of the particular cache block, the instruction power level.

19. The non-transitory computer-readable storage medium of claim 17 wherein the power predictor comprises a branch predictor and the processor instruction comprises a branch instruction, and wherein to store, by the power predictor based on the processor core power quantifier, the instruction power level in association with the processor instruction, the instructions further cause the power predictor to store the instruction power level in association with the branch instruction.

20. The non-transitory computer-readable storage medium of claim 17 wherein the instructions further cause the power predictor to:
   receive, by the power controller, the proposed power level;
   determine that the processor core is executing at a power level that differs from the proposed power level; and
   instruct the processor core to execute at the proposed power level.

* * * * *